(12) United States Patent
Rogers et al.

(10) Patent No.: US 7,329,461 B2
(45) Date of Patent: Feb. 12, 2008

(54) FLAME-RETARDANT SYNTHETIC RESIN ARTICLES CONTAINING FLAME-RETARDANT SUPERABSORBENT POLYMER (SAP) PARTICLES

(75) Inventors: Martin E. Rogers, Blacksburg, VA (US); Pascal Deschatelets, Louisville, KY (US); Janice P. Phillips, Salem, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 434 days.

(21) Appl. No.: 11/121,942

(22) Filed: May 5, 2005

(65) Prior Publication Data

US 2005/0203224 A1    Sep. 15, 2005

Related U.S. Application Data

(62) Division of application No. 10/829,443, filed on Apr. 22, 2004, now Pat. No. 7,001,942.

(60) Provisional application No. 60/466,424, filed on Apr. 30, 2003.

(51) Int. Cl.
    *C08K 5/49*    (2006.01)
(52) U.S. Cl. .................................. 428/411.1; 524/115
(58) Field of Classification Search ............. 428/411.1; 524/115
    See application file for complete search history.

(56) References Cited

U.S. PATENT DOCUMENTS

| | | | |
|---|---|---|---|
| 5,338,349 A * | 8/1994 | Farrar ..................... | 106/18.12 |
| 5,461,085 A | 10/1995 | Nagatomo et al. | |
| 5,525,703 A | 6/1996 | Kalota | |
| 5,612,384 A | 3/1997 | Ross et al. | |
| 5,669,894 A | 9/1997 | Goldman et al. | |
| 5,719,201 A | 2/1998 | Wilson | |
| 5,849,210 A | 12/1998 | Pascente et al. | |
| 6,290,887 B1 | 9/2001 | Sheu et al. | |
| 6,313,231 B1 * | 11/2001 | Hosokawa et al. ......... | 525/340 |
| 6,376,618 B1 | 4/2002 | Mitchell et al. | |
| 2002/0090453 A1 | 7/2002 | Muthiah et al. | |

FOREIGN PATENT DOCUMENTS

JP    04306508 A    *  10/1992

OTHER PUBLICATIONS

International Search Report dated Mar. 10, 2005; PCT/US04/12657.

* cited by examiner

*Primary Examiner*—David W. Wu
*Assistant Examiner*—Satya Sastri
(74) *Attorney, Agent, or Firm*—Nixon & Vanderhye P.C.

(57) ABSTRACT

Flame-retardant synthetic resin articles and methods of making the same are provided whereby flame-retardant SAP particles are incorporated into synthetic resins, especially curable thermosettable resins. The SAP particles are most preferably hydrated with an aqueous flame-retardant solution. In this regard, the flame-retardant solution may consist essentially of water alone or a water solution containing one or more water soluble inorganic flame retardants. When SAP particles are hydrated with an aqueous inorganic flame retardant solution, the SAP particles may thereafter be dried to remove substantially the water component. In such a manner, the inorganic flame retardant will remain as a dried residue physically entrained within the SAP particles. As such, the SAP particles serve as a physical matrix in which the inorganic flame retardant is homogenously dispersed. The SAP particles may then be blended with a synthetic resin as is or alternatively may be ground into more finely divided particles which contain the dried residue of the aqueous inorganic flame retardant solution and then blended with a suitable synthetic resin.

28 Claims, No Drawings

FLAME-RETARDANT SYNTHETIC RESIN ARTICLES CONTAINING FLAME-RETARDANT SUPERABSORBENT POLYMER (SAP) PARTICLES

CROSS-REFERENCE TO RELATED APPLICATION

This application is a divisional of U.S. patent application Ser. No. 10/829,443 filed on Apr. 22, 2004 (now U.S. Pat. No. 7,001,942 B2), which in turn is based on, and claims domestic priority benefits under 35 USC §119(e) from, U.S. Provisional Application Ser. No. 60/466,424 filed on Apr. 30, 2003, the entire content of each being expressly incorporated hereinto by reference.

FIELD OF THE INVENTION

The present invention relates generally to flame retardant materials and methods. In especially preferred embodiments, the present invention relates to flame retardant materials and methods which employ a flame-retardant superabsorbent polymer (SAP).

BACKGROUND AND SUMMARY OF THE INVENTION

Fiberglass-reinforced plastics (FRP) composites are finding increased usage in a variety of end-use applications. For examples, FRP composites are increasingly being used in ships, especially Naval ships, as load-bearing structures, such as light weight foundations, deckhouses and masts.[1] Industrial uses for FRP composites include piping, valves, centrifugal pumps, heat exchangers as well as gratings, screens and ventilation ducts. Such increased usage is being driven by a number of market needs, for example, so as to reduce maintenance, lower weight, increase covertness (especially for Naval warships) and decrease costs. FRP composites must however be sufficiently fire resistant so that the composite is not a source of spontaneous combustion and will not contribute to the rapid spread of fire. Generally, flame retardants are incorporated in a FRP composite to achieve the desired flame resistance.

[1] U. Sorathia, J. Ness, M. Blum, "Fire safety of composites in the US Navy", Composites: Part A, 30, 707-713 (1999).

Flame retardants interfere with burning by acting either through the vapor phase or the condensed phase by chemical and/or physical mechanisms. Some common types of flame retardants and mechanisms of action include:[2]

[2] Lu et al, "Recent developments in the chemistry of halogen-free flame retardant polymers", Prog Polym Sci, 27, 1661-1712 (2002).

Fillers—act to dilute the polymer and reduce concentration of decomposition gases;

Hydrated fillers—release non-flammable gases or decompose endothermically to cool the pyrolysis zone at the combustion surface;

Halogen, phosphorus and antimony—act in vapor phase by a radical mechanism to interrupt the exothermic processes and to suppress combustion;

Phosphorus—also acts in the condensed phase promoting char formation acting as a barrier to inhibit gaseous products from diffusing to the flame and shields the polymer from heat and air; and Intumescent materials—materials swell when exposed to fire or heat to form a porous foamed mass acting as a barrier to heat, air and pyrolysis products.

In FRP composite materials, fillers and halogenated resins are the most common methods used to achieve flame resistance. Fillers such as aluminum trihydrate release water upon heating. However, such fillers have to be incorporated in high amounts and have a negative effect on mechanical properties. Halogenated resins have clear disadvantages, particularly, the toxicity of hydrogen halide formed during combustion.[3] Toxic fumes released during the combustion of halogenated resins can be lethal in the confined spaces found in aircraft fuselages or marine hull compartments.

[3] Id.

Flame retardants can be incorporated into polymeric materials either as additives or as reactive materials. Additive type flame retardants are widely used by blending with polymeric materials. In FRP resins, the flame retardant additive is added to the resin prior to fiber impregnation. Additives present problems including poor compatibility, leaching and reduced mechanical properties. Reactive flame retardants are an attempt to overcome the problems of additives through copolymerization of the flame retardant with the polymer. Copolymerized flame retardants are designed not to leach or reduce mechanical properties. At this time, most copolymerized flame retardants are based on halogenated monomers with the aforementioned problems of toxicity.

Recently, in U.S. Pat. No. 6,290,887 to Sheu et al (the entire content of which is expressly incorporated hereinto by reference), superabsorbent polymer (SAP) particles preloaded with moisture have been incorporated into a thermoplastic polymer (e.g., polyethylene) so as to obtain a SAP-enriched plastics material that may be extruded into desired shapes (e.g., as an outer jacket of a telecommunications cable).

It would therefore be desirable if flame-retardant SAP could be incorporated in curable thermoset resins without adversely affecting the resin curing process. It would especially be desirable if such flame-retardant SAP could be reacted with curable thermoset resins during the curing process so that, when cured, the SAP would be chemically bound (linked) to the polymeric chain of the resulting cured thermoset resin. In such a manner, improvements to flame retardant properties as well as improvements to other mechanical/physical properties (e.g., impact resistance) could be "engineered" into FRP composites formed of such thermoset resins. It is towards fulfilling such needs that the present invention is directed.

Broadly, the present invention is embodied in products and processes whereby flame-retardant SAP particles are incorporated into synthetic resins, especially curable thermosettable resins. The SAP particles are most preferably hydrated with an aqueous flame-retardant solution. In this regard, the flame-retardant solution may consist essentially of water alone or a water solution containing one or more water soluble inorganic flame retardants.

When SAP particles are hydrated with an aqueous inorganic flame retardant solution, the SAP particles may thereafter be dried to remove substantially the water component. In such a manner, the inorganic flame retardant will remain as a dried residue physically entrained within the SAP particles. As such, the SAP particles serve as a physical matrix in which the inorganic flame retardant is homogenously dispersed. The SAP particles may then be blended with a synthetic resin as is or alternatively may be ground into more finely divided particles which contain the dried residue of the aqueous inorganic flame retardant solution and then blended with a suitable synthetic resin.

It has been found that, when incorporated into a curable thermoset resin and cured, the fame-retardant SAP particles do not affect the curing process of the thermoset resin. The SAP particles may also be modified so as to include one or more pendant reactive groups which serve to react with the thermoset resin during the curing process so as to be chemically bound (linked) thereto.

These and other aspects and advantages will become more apparent after careful consideration is given to the following detailed description of the preferred exemplary embodiments thereof.

DETAILED DESCRIPTION OF THE INVENTION

Superabsorbent polymers (SAPs) are in and of themselves well known and have the ability to absorb many times their weight in water. Virtually any SAP may be employed in the practice of the present invention. For example, SAP as disclosed in U.S. Pat. Nos. 5,461,085; 5,525,703; 5,612,384 and/or 5,669,894 (the entire contents of each patent being incorporated expressly hereinto by reference) may be employed. SAPs are available commercially in a variety of chemical forms, including substituted and unsubstituted natural and synthetic polymers, such as hydrolysis products of starch acrylonitrile graft polymers, carboxymethylcellulose, cross-linked polyacrylates, sulfonated polystyrenes, hydrolyzed polyacrylamides, polyvinyl alcohols, polyethylene oxides, polyvinylpyrrolidones, polyacrylonitriles and the like.

SAP is typically provided in the form of particles. As used herein, the term "SAP particles" and like terms mean granules, fibers, flakes, spheres, powders, platelets, and/or other solid shapes and forms known to those skilled in the SAP art. SAP particles having a nominal particle size of less than about 100 microns (e.g., between about 0.20 micron to about 50 microns, and more preferably between about 0.50 micron to about 10 microns), to up to about 500 microns (e.g., between about 100 to about 500 microns) may be employed in the practice of the present invention. As used herein, the term "nominal particle size" means the size of a particle capable of passing through a screen of a stated mesh size. The SAP particles may be ground to a more finely divided particulate form so as to achieve the desired nominal particle size. For example, dried SAP particles containing the residue of a water-soluble inorganic flame retardant may first be ground to a nominal particle size of about 300 microns or less prior to being blended with a thermoset resin in a flame-retarding effective amount.

The SAP particles employed in the practice of the present invention are most preferably hydrated. By the term "hydrated SAP particles" is meant that the SAP particles are in a hydrated state in that the SAP particles have absorbed at least 5% of their own weight, and usually several times their weight, in water. Conversely, the term "dried SAP particles" is meant to refer to SAP particles that have previously been hydrated, but which have subsequently been dried to a water absorption content of less than 5%, and typically less than 3%, of the their own weight.

The SAP particles may be hydrated with an aqueous solution containing one or more inorganic flame retardants. Most preferably, the inorganic flame retardants are water-soluble so that they may be dissolved in water to form an aqueous inorganic flame retardant solution that may then be absorbed by the SAP particles. Once absorbed, the SAP particles may be dried to remove the water thereby leaving the inorganic flame retardant physically within the SAP particles as a dried residue of the aqueous inorganic flame retardant solution. By the term "dried residue" is meant that the solute (e.g., the inorganic flame retardant) remains physically following evaporation or removal of water. By the term "water soluble" is meant that at least about 1 g of solute per 100 cc of water, more preferably at least about 10 g of solute per 100 cc of water, dissolves.

Specific examples of water-soluble inorganic flame retardants that may be employed in the practice of the present invention include boric acid (ortho and tetra), sodium tetraborate and hydrate, sodium metaborate and hydrates, zinc borate, phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, ammonium dihydrogen orthophosphite, ammonium sulfamate, ammonium bromide, ammonium sulfate, and sodium tungstate. Most preferably, the inorganic flame retardant is present in the SAP particles in an amount of between about 1 to about 500 wt. %, more preferably between about 25 wt. % to about 200 wt. %, based on the total weight of the flame-retardant SAP particles.

The SAP may be modified so as to include one or more pendant reactive groups which serve as sites to react with, and be chemically bound (linked) to, the curable thermoset resin during the curing process. The pendant reactive groups of the modified SAP may be virtually any group or groups capable of reacting with functional groups present in a thermosetting resin. Examples of the reactive groups provided with modified SAP in accordance with the present invention include, for example, acrylics, methacrylics, styryls, epoxies (oxirane), isocyanates, aromatic alcohols, thiols, carboxylic acids, hydroxyls, amines, and like groups.

Examples of thermosetting resins include acrylics, urethanes, unsaturated polyesters, vinyl esters, epoxies, phenol/formaldehyde resins, urea/formaldehyde resins and melamine/formaldehyde resins; crosslinkable acrylic resins derived from substituted acrylates such as epoxy acrylates, hydroxy acrylates, isocyanato acrylates, urethane acrylates or polyester acrylates; alkyd resins, polyester resins and acrylate resins crosslinked with melamine resins, urea resins, isocyanates, isocyanurates, carbamates or epoxy resins Suitable unsaturated polyester resins include practically any esterification product of a polybasic organic acid or anhydride and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The resin can be formed by the addition of recycled polyethylene terephthalate (PET), such as from soda bottles to the base resin prior to polymerization. PET bottles can be ground and depolymerized in the presence of a glycol, which produces an oligomer. The oligomer can then be added to a polymerization mixture containing polyester monomer and polymerized with such monomer to an unsaturated polyester.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g., 2-butene-1,4-diol).

Suitable vinyl ester resins include practically any reaction product of an unsaturated polycarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as bisphenol-A, 4,4'-dihydroxydiphenyl-sulfone, 4,4'-dihydroxy biphenyl, 4,4'-dihydroxydi-phenylmethane, 2,2'-dihydroxydiphenyloxide, and the like.

Typically, the unsaturated polyester or vinyl ester resin material also includes a vinyl monomer in which the thermosetting resin is solubilized. Suitable vinyl monomers include styrene, vinyl toluene, methyl methacrylate, p-methyl styrene, divinyl benzene, diallyl phthalate and the like. Styrene is the preferred vinyl monomer for solubilizing unsaturated polyester or vinyl ester resins.

Suitable phenolic resins include practically any reaction product of a aromatic alcohol with an aldehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formaldehyde, acetaldehyde, propionaldehyde, phenylacetaldehyde, and benzaldehyde. Particularly preferred are the phenolic resins prepared by the reaction of phenol with formaldehyde.

The resin may comprise an epoxy resin, i.e., one that contains at least one oxirane group in the molecule. Hydroxyl substituent groups can also be present and frequently are, as well as ether groups. Halogen substituents may also be present. Generally, the epoxy resins can be broadly categorized as being aliphatic, aromatic, cyclic, acyclic, alicyclic or heterocyclic. Preferably aromatic epoxide resins are used. One particularly preferred group of aromatic epoxy resins are the polyglycidyl ethers of polyhydric aromatic alcohols, such as, for example, dihydric phenols. Suitable examples of dihydric phenols include resorcinol, catechol, hydroquinone, bis(4-hydroxyphenyl)-1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Of the many epoxy compounds that may be utilized to synthesize the epoxy resins, the one principally utilized is epichlorohydrin, although epibromohydrin is also useful. The polyglycidyl ethers are obtained by reacting epichlorohydrin and bisphenol A in the presence of an alkali such as sodium or potassium hydroxide. The series of epoxy resins sold by Shell Chemical Company under the trademark EPON are useful. Another group of useful epoxy resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane. Also useful are the epoxide resins that are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-napthalene dicarboxylic acid and dimerized linoleic acid. Still another group of epoxide resins are derived from the epoxidation of an olefinically unsaturated alicyclic material. Among these are the epoxy alicyclic ethers and esters well known in the art.

Epoxy resins also include those containing oxyalkylene groups. Such groups can be pendant from the backbone of the epoxide resin or they can be included as part of the backbone. The proportion of oxyalkylene groups in the epoxy resin depends upon a number of factors, such as the size of the oxyalkylene group and the nature of the epoxy resin.

One additional class of epoxy resins encompasses the epoxy novolac resins. These resins are prepared by reacting an epihalohydrin with the condensation product of an aldehyde with a monohydric or polyhydric phenol. One example is the reaction product of epichlorohydrin with a phenol-formaldehyde condensate. A mixture of epoxy resins can also be used herein.

The epoxy resins require the addition of a curing agent in order to convert them to thermoset materials. In general, the curing agents which can be utilized herein can be selected from a variety of conventionally known materials, for example, amine type, including aliphatic and aromatic amines, and poly(amine-amides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by Henkel Corporation under the name VERSAMID. Preferably the poly(amine-amide) materials such as VERSAMID or its equivalent are utilized.

Also suitable as curing agents for epoxies are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-substituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride. In addition, aldehyde condensation products such as urea-, melamine-, or phenol-formaldehyde are useful curing agents. Other suitable curing agents include boron trihalide and complexes of boron trihalide with amines, ethers, phenols and the like; polymercaptans; polyphenols; metal salts such as aluminum chloride, zinc chloride and magnesium perchlorate; inorganic acids and partial esters such as phosphoric acid and n-butyl orthophosphite. It should be understood that blocked or latent curing agents can also be utilized if desired; for example, ketimines that are prepared from a polyamine and a ketone.

The amount of the epoxy resin and curing agent utilized can vary, but generally the equivalent ratio of epoxy to amine is within the range of from 0.05:1 to 10:1. Preferably, the epoxy to amine equivalent ratio is within the range of from 0.1:1 to 1:1, and more preferably within the range of 0.3:1 to 0.9:1.

The pendant reactive groups of the modified SAP may be virtually any group or groups capable of reacting with functional groups present in a thermosetting resin. Examples of the reactive groups provided with modified SAP in accordance with the present invention include, for example, acrylics, methacrylics, styryls, epoxies (oxirane), isocyanates, aromatic alcohols, thiols, carboxylic acids, hydroxyls, amines, and like groups.

Examples of thermosetting resins include acrylics, urethanes, unsaturated polyesters, vinyl esters, epoxies, phenol/formaldehyde resins, urea/formaldehyde resins and melamine/formaldehyde resins; crosslinkable acrylic resins derived from substituted acrylates such as epoxy acrylates, hydroxy acrylates, isocyanato acrylates, urethane acrylates or polyester acrylates; alkyd resins, polyester resins and acrylate resins crosslinked with melamine resins, urea resins, isocyanates, isocyanurates, carbamates or epoxy resins Suitable unsaturated polyester resins include practically any esterification product of a polybasic organic acid or anhydride and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The resin can be formed by the addition of recycled polyethylene terephthalate (PET), such as from soda bottles to the base resin prior to polymerization. PET bottles can be ground and depolymerized in the presence of a glycol, which produces an oligomer. The oligomer can then be added to a polymerization mixture containing polyester monomer and polymerized with such monomer to an unsaturated polyester.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g., 2-butene-1,4-diol).

Suitable vinyl ester resins include practically any reaction product of an unsaturated polycarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as bisphenol-A, 4,4'-dihydroxydiphenyl-sulfone, 4,4'-dihydroxy biphenyl, 4,4'-dihydroxydi-phenylmethane, 2,2'-dihydroxydiphenyloxide, and the like.

Typically, the unsaturated polyester or vinyl ester resin material also includes a vinyl monomer in which the thermosetting resin is solubilized. Suitable vinyl monomers include styrene, vinyl toluene, methyl methacrylate, p-methyl styrene, divinyl benzene, diallyl phthalate and the like. Styrene is the preferred vinyl monomer for solubilizing unsaturated polyester or vinyl ester resins.

Suitable phenolic resins include practically any reaction product of a aromatic alcohol with an aldehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formaldehyde, acetaldehyde, propionaldehyde, phenylacetaldehyde, and benzaldehyde. Particularly preferred are the phenolic resins prepared by the reaction of phenol with formaldehyde.

The resin may comprise an epoxy resin, i.e., one that contains at least one oxirane group in the molecule. Hydroxyl substituent groups can also be present and frequently are, as well as ether groups. Halogen substituents may also be present. Generally, the epoxy resins can be broadly categorized as being aliphatic, aromatic, cyclic, acyclic, alicylic or heterocyclic. Preferably aromatic epoxide resins are used. One particularly preferred group of aromatic epoxy resins are the polyglycidyl ethers of polyhydric aromatic alcohols, such as, for example, dihydric phenols. Suitable examples of dihydric phenols include resorcinol, catechol, hydroquinone, bis(4-hydroxyphenyl)-1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Of the many epoxy compounds that may be utilized to synthesize the epoxy resins, the one principally utilized is epichlorohydrin, although epibromohydrin is also useful. The polyglycidyl ethers are obtained by reacting epichlorohydrin and bisphenol A in the presence of an alkali such as sodium or potassium hydroxide. The series of epoxy resins sold by Shell Chemical Company under the trademark EPON are useful. Another group of useful epoxy resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane. Also useful are the epoxide resins that are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-napthalene dicarboxylic acid and dimerized linoleic acid. Still another group of epoxide resins are derived from the epoxidation of an olefinically unsaturated alicyclic material. Among these are the epoxy alicyclic ethers and esters well known in the art.

Epoxy resins also include those containing oxyalkylene groups. Such groups can be pendant from the backbone of the epoxide resin or they can be included as part of the backbone. The proportion of oxyalkylene groups in the epoxy resin depends upon a number of factors, such as the size of the oxyalkylene group and the nature of the epoxy resin.

One additional class of epoxy resins encompasses the epoxy novolac resins. These resins are prepared by reacting an epihalohydrin with the condensation product of an aldehyde with a monohydric or polyhydric phenol. One example is the reaction product of epichlorohydrin with a phenol-formaldehyde condensate. A mixture of epoxy resins can also be used herein.

The epoxy resins require the addition of a curing agent in order to convert them to thermoset materials. In general, the curing agents which can be utilized herein can be selected from a variety of conventionally known materials, for example, amine type, including aliphatic and aromatic amines, and poly(amine-amides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by Henkel Corporation under the registered trademark VERSAMID® curing agents. Preferably the poly(amine-amide) materials such as VERSAMID® curing agents or their equivalents are utilized.

Also suitable as curing agents for epoxies are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-substituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride. In addition, aldehyde condensation products such as urea-, melamine-, or phenol-formaldehyde are useful curing agents. Other suitable curing agents include boron trihalide and complexes of boron trihalide with amines, ethers, phenols and the like; polymercaptans; polyphenols; metal salts such as aluminum chloride, zinc chloride and magnesium perchlorate; inorganic acids and partial esters such as phosphoric acid and n-butyl orthophosphite. It should be understood that blocked or latent curing agents can also be utilized if desired; for example, ketimines that are prepared from a polyamine and a ketone.

The amount of the epoxy resin and curing agent utilized can vary, but generally the equivalent ratio of epoxy to amine is within the range of from 0.05:1 to 10:1. Preferably, the epoxy to amine equivalent ratio is within the range of from 0.1:1 to 1:1, and more preferably within the range of 0.3:1 to 0.9:1.

The SAP particles are incorporated into the curable thermoset resin in an amount sufficient to impart flame retardant properties to the cured resin. In general, the SAP particles may comprise up to about 50 wt. % of the resin, and typically between about 1 to about 15 wt. %, most preferably about 10 wt. %. By the term "flame retardant property" is meant that a shaped article comprised of a cured thermoset resin containing the SAP particles will either not be ignitable with a flame or if ignitable by a flame, will self-extinguish the flame within at least about 60 seconds.

The present invention will be further understood from the following non-limiting Examples.

EXAMPLES

Example 1

One unknown in incorporating hydrated SAPs into a composite resin is the effect of the water on resin curing. Water is detrimental to curing and subsequent resin properties. In order to explore this effect, deionized water (5 weight percent of resin) was mixed with a general purpose unsaturated polyester resin. A hardener (methyl ethyl ketone peroxide initiator) for the resin was then added. The resin did not cure to a hard clear cast but eventually turned into an opaque paste. In another test, SAP (10 weight percent of resin) and water (8.5 weight percent of resin) were mixed with an unsaturated polyester resin and hardener. The resin gelled in 32 minutes and thereafter cured to a hard clear cast. Thus, it was observed that hydrated SAP particles can be incorporated into a cured thermoset resin matrix without disrupting the curing process.

Example 2

The fire resistance of the cured resin containing the hydrated SAP (Sample B) was compared to a similarly cured resin without the SAP (Sample A). Both samples were suspended side-by-side on respective copper wires and ignited from the bottom with a propane torch. The flame on Sample A containing no SAP burned up the bar and completely consumed the sample evidencing no fire resistance properties. Sample B, containing the hydrated SAP in accordance with the present invention, self-extinguished the flame in less than five seconds sustaining little damage.

Example 3

Polyacrylamide microspheres (11 grams) were combined with 85% phosphoric acid (17.85 grams) and then dried for four hours at 110° C. and 20 hours at 130° C. in a vacuum oven. The polyacrylamide/phosphoric acid microspheres where ground and sifted through a 300 micron screen. The microspheres (13 grams) were then blended with an epoxy resin composed of 28.69 grams of D.E.R.™ 331 epoxy resin (Dow Chemical) and 10.32 grams of EPIKURE™ 9551 curing agent (Resolution Performance Products LLC) using a high speed mixer and poured into 7 cm diameter aluminum pan. The resin was put into a vacuum oven and degassed. The resin was then cured at 120° C. for two hours. The cured resin disk was suspended on a wire and the bottom side of the resin disk was exposed to a propane torch flame for 60 seconds. The torch flame was removed and the disk had not ignited. The disk was exposed to the torch flame for an additional 150 seconds. The torch flame was removed and the fire extinguished within 6 seconds. The sample retained 91% of its weight. In contrast, an epoxy control without the microspheres completely burned after being ignited by a 30 second torch flame exposure.

Example 4

Polyacrylamide microspheres (7 grams) were combined with diammonium phosphate (13.0 grams) dissolved in water (15.9 grams) and then dried for 20 hours at 120° C. in a vacuum oven. The polyacrylamide/diammonium phosphate microspheres were ground and sifted through a 300 micron screen. The ground microspheres (18 grams) were then blended with 38.5 grams of D.E.R.™ 331 epoxy resin (Dow Chemical) and 14.2 grams of EPIKURE™ 9551 curing agent (Resolution Performance Products LLC) using a high speed mixer and poured into 7 cm diameter aluminum pan. The resin was put into a vacuum oven and degassed. The resin was then cured at 120° C. for two hours. The cured resin disk was suspended on a wire and the bottom side of the resin disk was exposed to a propane torch flame for 60 seconds. The torch flame was removed and the disk had not ignited. The disk was exposed to the torch flame for an additional 120 seconds. The torch flame was removed and the fire extinguished within 5 seconds. In contrast, an epoxy control without the microspheres completely burned after being ignited by a 30 second torch flame exposure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

The invention claimed is:

1. A flame-retardant article comprising a synthetic resin and flame-retardant superabsorbent polymer (SAP) particles, wherein the flame-retardant superabsorbent polymer particles comprise superabsorbent polymer particles containing a dried residue, in an amount between about 25 wt. % to about 500 wt. % based on the total wt. of the flame retardant superabsorbent polymer particles, of an aqueous inorganic flame retardant solution.

2. The flame-retardant article as in claim 1, wherein the inorganic flame retardant includes at least one phosphorus-containing flame retardant.

3. The flame-retardant article as in claim 2, wherein the inorganic flame retardant is at least one selected from the group consisting of phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, and ammonium dihydrogen orthophosphite.

4. The flame-retardant article as in claim 1, wherein the inorganic flame retardant is at least one selected from the group consisting of boric acid, sodium tetraborate and hydrates thereof, sodium metaborate and hydrates thereof, and zinc borate.

5. The flame-retardant article of claim 1, wherein the synthetic resin is at least one selected from the group consisting of acrylic resins, urethane resins, polyester resins, vinyl esters, epoxy resins, phenol/formaldehyde resins, urea/formaldehyde resins, melamine/formaldehyde resins, alkyd resins and acrylate resins.

6. The flame-retardant article of claim 1, wherein the synthetic resin comprises a crosslinked acrylic resin derived from substituted acrylates.

7. The flame-retardant article of claim 6, wherein the substituted acrylates comprise epoxy acrylates, hydroxy acrylates, isocyanato acrylates, urethane acrylates or polyester acrylates.

8. The flame-retardant article of claim 1, wherein the synthetic resin comprises an acrylate resin crosslinked with at least one of a melamine resin, urea resin, isocyanate resin, isocyanurate resin, carbamate resin or epoxy resin.

9. The flame-retardant article of claim 1, wherein the synthetic resin is a cured thermoset resin.

10. A method of making a flame-retardant synthetic resin article comprising incorporating into a synthetic resin, flame-retardant superabsorbent polymer (SAP) particles, wherein the flame-retardant superabsorbent polymer particles comprise superabsorbent polymer particles containing a dried residue, in an amount between about 25 wt. % to about 500 wt. % based on the total wt. of the flame retardant superabsorbent polymer particles, of an aqueous inorganic flame retardant solution.

11. The method as in claim 10, wherein the inorganic flame retardant includes at least one phosphorus-containing flame retardant.

12. The method as in claim 11, wherein the inorganic flame retardant is at least one selected from the group consisting of phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, and ammonium dihydrogen orthophosphite.

13. The method as in claim 10, wherein the inorganic flame retardant is at least one selected from the group consisting of boric acid, sodium tetraborate and hydrates thereof, sodium metaborate and hydrates thereof, and zinc borate.

14. The method of claim 10, wherein the synthetic resin is at least one selected from the group consisting of acrylic resins, urethane resins, polyester resins, vinyl esters, epoxy resins, phenol/formaldehyde resins, urea/formaldehyde resins, melamine/formaldehyde resins, alkyd resins and acrylate resins.

15. The method of claim 10, wherein the synthetic resin comprises a crosslinked acrylic resin derived from substituted acrylates.

16. The method of claim 15, wherein the substituted acrylates comprise epoxy acrylates, hydroxy acrylates, isocyanato acrylates, urethane acrylates or polyester acrylates.

17. The method of claim 10, wherein the synthetic resin comprises an acrylate resin crosslinked with at least one of a melamine resin, urea resin, isocyanate resin, isocyanurate resin, carbamate resin or epoxy resin.

18. The method of claim 10, wherein the synthetic resin is a cured thermoset resin.

19. A flame-retardant article comprising cured thermoset resin and flame-retardant superabsorbent polymer (SAP) particles, wherein the flame-retardant superabsorbent polymer particles comprise superabsorbent polymer particles containing a dried residue, in an amount between about 25 wt. % to about 500 wt. % based on the total wt. of the flame retardant superabsorbent polymer particles, of an aqueous inorganic flame retardant solution.

20. The flame-retardant article as in claim 19, wherein the inorganic flame retardant includes at least one phosphorus-containing flame retardant.

21. The flame-retardant article as in claim 20, wherein the inorganic flame retardant is at least one selected from the group consisting of phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, and ammonium dihydrogen orthophosphite.

22. The flame-retardant article as in claim 19, wherein the inorganic flame retardant is at least one selected from the group consisting of boric acid, sodium tetraborate and hydrates thereof, sodium metaborate and hydrates thereof, and zinc borate.

23. A method of making a cured flame-thermoset resin article comprising the steps of:
   (a) blending an uncured synthetic resin and flame-retardant superabsorbent polymer (SAP) particles, wherein the flame-retardant superabsorbent polymer particles comprise superabsorbent polymer particles containing a dried residue, in an amount between about 25 wt. % to about 500 wt. % based on the total wt. of the flame retardant superabsorbent polymer particles, of an aqueous inorganic flame retardant solution,
   (b) curing the blend of uncured synthetic resin and flame-retardant superabsorbent polymer particles to form the cured flame-retardant thermoset resin article.

24. The method of claim 23, wherein prior to step (a) there is practiced the step of hydrating SAP particles with an aqueous inorganic flame-retardant solution.

25. The method of claim 24, which further comprises drying the hydrated SAP particles to remove water and leave a dried residue of the inorganic flame-retardant solution physically within the SAP particles.

26. The method as in claim 23, wherein the inorganic flame retardant includes at least one phosphorus-containing flame retardant.

27. The method as in claim 26, wherein the inorganic flame retardant is at least one selected from the group consisting of phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, and ammonium dihydrogen orthophosphite.

28. The method as in claim 23, wherein the inorganic flame retardant is at least one selected from the group consisting of boric acid, sodium tetraborate and hydrates thereof, sodium metaborate and hydrates thereof, and zinc borate.

* * * * *